United States Patent
Nishiyama et al.

(10) Patent No.: US 9,657,383 B2
(45) Date of Patent: May 23, 2017

(54) HEAT RESISTANT FERRITIC STEEL AND METHOD FOR PRODUCING THE SAME

(71) Applicant: NIPPON STEEL & SUMITOMO METAL CORPORATION, Tokyo (JP)

(72) Inventors: Yoshitaka Nishiyama, Tokyo (JP); Hiroshi Matsuo, Tokyo (JP); Shunichi Otsuka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/359,735

(22) PCT Filed: Nov. 21, 2012

(86) PCT No.: PCT/JP2012/080198
§ 371 (c)(1),
(2) Date: May 21, 2014

(87) PCT Pub. No.: WO2013/077363
PCT Pub. Date: May 30, 2013

(65) Prior Publication Data
US 2014/0295194 A1    Oct. 2, 2014

(30) Foreign Application Priority Data

Nov. 22, 2011  (JP) ................................. 2011-255461
Dec. 16, 2011  (JP) ................................. 2011-275725

(51) Int. Cl.

| | | |
|---|---|---|
| *C23C 8/14* | (2006.01) | |
| *C23C 8/18* | (2006.01) | |
| *C22C 38/38* | (2006.01) | |
| *C22C 38/58* | (2006.01) | |
| *C22C 38/00* | (2006.01) | |
| *C22C 38/02* | (2006.01) | |
| *C22C 38/04* | (2006.01) | |
| *C22C 38/18* | (2006.01) | |
| *C22C 38/20* | (2006.01) | |
| *C22C 38/22* | (2006.01) | |
| *C22C 38/24* | (2006.01) | |
| *C22C 38/26* | (2006.01) | |
| *C22C 38/30* | (2006.01) | |
| *C21D 6/00* | (2006.01) | |
| *C22C 38/14* | (2006.01) | |
| *F24J 2/48* | (2006.01) | |
| *C23C 4/11* | (2016.01) | |
| *C23C 4/134* | (2016.01) | |
| *F24J 2/07* | (2006.01) | |

(52) U.S. Cl.
CPC .............. *C23C 8/14* (2013.01); *C21D 6/002* (2013.01); *C22C 38/001* (2013.01); *C22C 38/002* (2013.01); *C22C 38/005* (2013.01); *C22C 38/02* (2013.01); *C22C 38/04* (2013.01); *C22C 38/14* (2013.01); *C22C 38/18* (2013.01); *C22C 38/20* (2013.01); *C22C 38/22* (2013.01); *C22C 38/24* (2013.01); *C22C 38/26* (2013.01); *C22C 38/30* (2013.01); *C22C 38/38* (2013.01); *C22C 38/58* (2013.01); *C23C 4/11* (2016.01); *C23C 4/134* (2016.01); *C23C 8/18* (2013.01); *F24J 2/487* (2013.01); *C21D 2211/005* (2013.01); *F24J 2/07* (2013.01); *Y02E 10/40* (2013.01)

(58) Field of Classification Search
None
See application file for complete search history.

(56) References Cited

U.S. PATENT DOCUMENTS

| 4,799,972 A | * | 1/1989 | Masuyama | ............. C22C 38/22 148/325 |
|---|---|---|---|---|
| 2007/0207329 A1 | * | 9/2007 | Chun | ................... C10G 9/203 428/469 |
| 2012/0145285 A1 | * | 6/2012 | Hattendorf | ............ C21D 6/002 148/504 |

FOREIGN PATENT DOCUMENTS

| DE | WO 2011026460 A1 * | 3/2011 | ............ C21D 6/002 |
|---|---|---|---|
| JP | 52-126434 | 10/1977 | |
| JP | 53-75132 | 7/1978 | |
| JP | 55-77667 | 6/1980 | |
| JP | 58-195746 | 11/1983 | |
| JP | 60-57157 | 4/1985 | |
| JP | 62-182553 | 8/1987 | |
| JP | 64-47880 | 2/1989 | |
| JP | 04-52252 | 2/1992 | |
| JP | 07-325212 | 12/1995 | |
| JP | 2006-131945 | 5/2006 | |
| JP | 2006-218595 | 8/2006 | |
| JP | 2008-101240 | 5/2008 | |
| JP | 2008-223128 | 9/2008 | |
| JP | 2010-78336 | 4/2010 | |
| JP | 2010-159487 | 7/2010 | |
| JP | 2011-190478 | 9/2011 | |
| WO | 93/21356 | 10/1993 | |

OTHER PUBLICATIONS

JP 2008-223128_MT Sep. 25, 2008.*
JP 2008-101240_MT Jan. 5, 2008.*
Shmakov, et.al J. Appl. Cryst. (1995), 28, 141-145.*
Zhang et al., "Study of High . . . Ferritic Stainless Steel", Proceedings of the Fifth Youth Academic Annual Conference of the Chinese Society for Metals, Dec. 21, 2010.

* cited by examiner

*Primary Examiner* — Vera Katz
(74) *Attorney, Agent, or Firm* — Clark & Brody

(57) ABSTRACT

There is provided a heat resistant ferritic steel including a base material including, by mass percent, C: 0.01 to 0.3%, Si: 0.01 to 2%, Mn: 0.01 to 2%, P: at most 0.10%, S: at most 0.03%, Cr: 7.5 to 14.0%, sol.Al: at most 0.3%, and N: 0.005 to 0.15%, the balance being Fe and impurities, and an oxide film that is formed on the base material and contains 25 to 97% of Fe and 3 to 75% of Cr. This heat resistant ferritic steel is excellent in photoselective absorptivity and oxidation resistance.

2 Claims, No Drawings

HEAT RESISTANT FERRITIC STEEL AND METHOD FOR PRODUCING THE SAME

TECHNICAL FIELD

The present invention relates to a heat resistant steel and a method for producing the steel and, more particularly, to a heat resistant ferritic steel and a method for producing the steel.

BACKGROUND ART

In recent years, to achieve energy saving, the development of highly efficient boilers has been advanced. For example, an ultra supercritical pressure boiler uses higher temperature and pressure of steam than those in a conventional boiler to enhance the energy efficiency. Also, a boiler using wastes or biomass as a fuel other than fossil fuels has been developed. Further, there has been advanced the development of an electric power plant boiler utilizing solar heat has been developed. In particular, a solar thermal power plant boiler has attracted attention from the viewpoints of energy saving and environmental preservation. As a steel material of heat exchangers and the like for these boilers, a heat resistant ferritic steel may be used. The boiler steam temperature is high, and reaches a temperature close to 600° C. in some cases. The heat resistant ferritic steel used in such an application is required to have excellent photoselective absorptivity.

The photoselective absorptivity is a property such that absorptivity changes in different wavelength regions. The term of "excellent photoselective absorptivity" means that, for light (electromagnetic wave) of visual to near-infrared region (wavelength: 0.3 to 1 μm, hereinafter referred to as "low wavelength side"), the absorptivity is high, and for light (electromagnetic wave) of medium- to far-infrared region (wavelength: 2.5 to 25 μm, hereinafter referred to as "high wavelength side"), the radioactivity is low. In other words, the photoselective absorptivity means that the reflectance of light on the low wavelength side is low, and the reflectance of light on the high wavelength side is high.

To attain excellent photoselective absorptivity, various methods have been proposed so far. JP52-126434A (Patent Document 1) and JP58-195746A (Patent Document 2) disclose methods in which the photoselective absorptivity is enhanced by forming an organic coated film on the surface of steel material. The paint disclosed in Patent Document 1 consists of semiconductor particles having an energy band width of 0.4 to 1.5 eV, a polyvinyl butyral organic binder, and a solvent. The paint for photoselective absorbing film disclosed in Patent Document 2 contains carboxylic acid amide copolymer, oxides, and solvent-based paint.

JP53-75132A (Patent Document 3), JP60-57157A (Patent Document 4), and JP62-182553A (Patent Document 5) disclose methods in which, to attain the photoselective absorptivity, triiron tetraoxide ($Fe_3O_4$: magnetite) is formed on the surface of steel by chemical treatment or the like. Specifically, in Patent Document 3, a selective absorbing film consisting of magnetite is formed by immersing a base material consisting mainly of iron in a high-temperature alkaline solution. In Patent Document 4, a selective absorbing film consisting of magnetite is formed by electrooxidizing a base material consisting mainly of iron in an acidic solution. In Patent Document 5, a selective absorbing film consisting of magnetite is formed by electrooxidizing a base material consisting mainly of iron in an acidic solution after the surface of base material has been iron-plated.

JP55-77667A (Patent Document 6) discloses a method in which an oxide film consisting mainly of Fe that has a film thickness of 500 to 2000 angstroms and contains 11.00 to 26.00 wt % of Cr is formed by a chemical treatment method or the like method, and the surface of oxide film is mirror-polished. Patent Document 6 describes that the photoselective absorptivity is enhanced by this method.

JP7-325212A (Patent Document 7) discloses a method in which a film consisting of iron oxide is formed on the surface of steel by spraying. Patent Document 7 describes that the photoselective absorptivity is enhanced by this method.

DISCLOSURE OF THE INVENTION

In recent years, to increase power generation efficiency, the boiler steam temperature in solar power generation is as high as 500 to 600° C., and in the future, it is expected that the boiler steam temperature will become much higher. In such a high-temperature environment, it is difficult to maintain the photoselective absorptivity. Since the coated film described in Patent Documents 1 and 2 is organic, the coated film is less applicable in the above-described high-temperature environment. The oxide film described in Patent Documents 3 to 5 consists of magnetite. Therefore, the radioactivity at high temperatures, that is, the radioactivity on the high wavelength side is high, and the photoselective absorptivity is poor. The oxide film described in Patent Document 6 may have low photoselective absorptivity at high temperatures. The oxide film described in Patent Document 7 may have high radioactivity especially at high temperatures, that is, high radioactivity on the high wavelength side.

An objective of the present invention is to provide a heat resistant ferritic steel excellent in photoselective absorptivity.

The heat resistant ferritic steel in accordance with the present invention includes a base material comprising, by mass percent, C, 0.01 to 0.3%, Si: 0.01 to 2%, Mn: 0.01 to 2%, P: at most 0.10%, S: at most 0.03%, Cr: 7.5 to 14.0%, sol.Al: at most 0.3%, and N: 0.005 to 0.15%, the balance being Fe and impurities, and an oxide film which is formed on the base material and whose chemical composition excluding oxygen and carbon contains 25 to 97% of Fe and 3 to 75% of Cr. The oxide film contains spinel-type oxides and $Cr_2O_3$.

The heat resistant ferritic steel in accordance with the present invention is excellent in photoselective absorptivity.

BEST MODE FOR CARRYING OUT THE INVENTION

An embodiment of the present invention will now be described in detail. The symbol "%" for the content of each element means "% by mass" unless otherwise noted.

The present inventors conducted researches and studies on the heat resistant ferritic steel excellent in photoselective absorptivity. As a result, the present inventors obtained the following findings.

(1) Among various oxides, triiron tetraoxide (hereinafter, referred to as magnetite), which is an Fe-based oxide, exhibits excellent absorptivity for light (electromagnetic wave) of visual to near-infrared region (wavelength: 0.3 to 1 μm, "low wavelength side"). However, for light (electromagnetic wave) of medium- to far-infrared region (wavelength: 2.5 to 25 μm, "high wavelength side"), magnetite has a high radioactivity. That is to say, in a high-temperature environment of 500 to 600° C., magnetite is liable to radiate heat.

(2) If the magnetite is made thin, the radioactivity for the light (electromagnetic wave) on the high wavelength side decreases. However, even if the oxide film consisting of very thin magnetite is formed, in high-temperature environments, Fe diffuses from the base material to the oxide film, and the oxide film grows and becomes thick. If the oxide film becomes thick, the photoselective absorptivity decreases.

(3) In the case where the oxide film contains Fe-based oxides and Cr-based oxides, or in the case where the Fe-based oxides themselves in the oxide film contain Cr, the radioactivity on the high wavelength side can be restrained. Chromium in the oxide film further restrains the growth of oxide film in high-temperature environments. Therefore, Cr can maintain the photoselective absorptivity of the oxide film for a long period of time.

(4) If the chemical composition of oxide film contains 25 to 97% of Fe and 3 to 75% of Cr, a heat resistant ferritic steel excellent in photoselective absorptivity can be obtained.

(5) Preferably, the oxide film contains spinel-type oxides and $Cr_2O_3$ (chromia). In this description, the spinel-type oxides include magnetite as well. The spinel-type oxides other than magnetite are oxides that contain, for example, Fe and Cr, and have spinel-type structures.

Chromia ($Cr_2O_3$) enhances the reflectance on the high wavelength side, and restrains the heat radiation of steel. Further, $Cr_2O_3$ enhances the oxidation resistance. Therefore, if the oxide film contains not only spinel-type oxides but also $Cr_2O_3$, the heat resistant ferritic steel having that oxide film is excellent in oxidation resistance, and also is excellent in photoselective absorptivity. Specifically, the reflectance of light (electromagnetic wave) on the low wavelength side is low, and the reflectance of light on the high wavelength side is high.

(6) Further preferably, in the case where the maximum diffraction peak intensity of spinel-type oxides obtained by X-ray surface analysis (XRD) is defined as Is, and the maximum diffraction peak intensity of $Cr_2O_3$ is defined as Ic, if Formula (1) is satisfied, the heat resistant ferritic steel attains excellent photoselective absorptivity. This is because, if Formula (1) is satisfied, $Cr_2O_3$ of an amount sufficient to enhance the reflectance on the high wavelength side is contained in the oxide film.

$$0.010 \leq Ic/Is \leq 10 \quad (1)$$

(7) Still further preferably, $Fe_2O_3$ (hematite) contained in the oxide film is restrained. If a large amount of $Fe_2O_3$ is contained in the oxide film, the reflectance of light (electromagnetic wave) on the low wavelength side of the oxide film is high, and the reflectance of light on the high wavelength side is low. As a result, the photoselective absorptivity decreases. Therefore, the amount of $Fe_2O_3$ (hematite) in the oxide film is preferably smaller.

More specifically, in the case where the maximum diffraction peak intensity of $Fe_2O_3$ is defined as Ih, Formula (2) is preferably satisfied. If the oxide film of the produced heat resistant ferritic steel satisfies Formula (2), since $Cr_2O_3$ of an amount sufficient to enhance the reflectance on the high wavelength side is contained in the oxide film with respect to the content of $Fe_2O_3$, excellent photoselective absorptivity can be attained.

$$Ih/(Is+Ic) \leq 0.05 \quad (2)$$

(8) The oxide film of the heat resistant ferritic steel is formed by oxidation treatment. In the oxidation treatment, if the oxygen partial pressure $Po_2$ (atm) in a gas atmosphere satisfies Formula (3), $Fe_2O_3$ is restrained effectively. More specifically, if the oxygen partial pressure $Po_2$ (atm) satisfies Formula (3), the formed oxide film satisfies Formula (2):

$$Po_2 \leq 2.76 \times 10^{15} \times \exp\{-493.6 \times 10^3/(RT)\} \quad (3)$$

where R is a gas constant whose unit is $J \cdot K^{-1} \cdot mol^{-1}$, and T is a temperature whose unit is K.

The heat resistant ferritic steel in accordance with this embodiment, completed on the basis of the above findings, and the method for producing the steel are as described below.

The heat resistant ferritic steel includes a base material and an oxide film. The base material comprises, by mass percent, C, 0.01 to 0.3%, Si: 0.01 to 2%, Mn: 0.01 to 2%, P: at most 0.10%, S: at most 0.03%, Cr: 7.5 to 14.0%, sol.Al: at most 0.3%, and N: 0.005 to 0.15%, the balance being Fe and impurities. The oxide film is formed on the base material and has a chemical composition, excluding oxygen and carbon in the oxide film, containing 25 to 97% of Fe and 3 to 75% of Cr. The oxide film contains spinel-type oxides and $Cr_2O_3$.

In this case, the heat resistant ferritic steel has excellent photoselective absorptivity.

Preferably, in the case where the maximum diffraction peak intensity of $Cr_2O_3$ obtained by X-ray diffraction is defined as Ic, and the maximum diffraction peak intensity of spinel-type oxides obtained by the X-ray diffraction is defined as Is, the following Formula (1) is satisfied.

$$0.010 \leq Ic/Is \leq 10 \quad (1)$$

In this case, excellent photoselective absorptivity can be attained.

The above-described base material of the heat resistant ferritic steel may further comprises one or more elements selected from first to fourth groups in lieu of some of Fe.

First group: Cu: at most 5%, Ni: at most 5%, and Co: at most 5%

Second group: Ti: at most 1.0%, V: at most 1.0%, Nb: at most 1.0%, Zr: at most 1.0%, and Hf: at most 1.0%

Third group: Mo: at most 5%, Ta: at most 5%, W: at most 5%, and Re: at most 5%

Fourth group: Ca: at most 0.1%, Mg: at most 0.1%, B: at most 0.1%, and rare earth metal (REM): at most 0.1%

The method for producing the heat resistant steel in accordance with this embodiment includes a step of preparing the base material having the above-described chemical composition, and a step of forming an oxide film on the base material by oxidizing the base material at a temperature of 500 to 1150° C. in a gas atmosphere in which the oxygen partial pressure $Po_2$ (atm) satisfies Formula (3):

$$Po_2 \leq 2.76 \times 10^{15} \times \exp\{-493.6 \times 10^3/(RT)\} \quad (3)$$

where R is a gas constant whose unit is $J \cdot K^{-1} \cdot mol^{-1}$, and T is a temperature whose unit is K.

The heat resistant ferritic steel produced by this production method has excellent photoselective absorptivity.

In the following, the details of the heat resistant ferritic steel in accordance with this embodiment are explained.

[Configuration of Heat Resistant Ferritic Steel]

The heat resistant ferritic steel in accordance with this embodiment includes a base material and an oxide film formed on the base material.

[Configuration of Base Material]

The base material has the following chemical composition.

C: 0.01 to 0.3%

Carbon (C) is an austenite stabilizing element for making the base material martensitic. Furthermore, C enhances the high-temperature strength of steel by forming carbides. On the other hand, if the C content is too high, carbides precipitate excessively, and therefore the workability and weldability of steel are decreased. Therefore, the C content is set to 0.01 to 0.3%. The lower limit of C content is preferably higher than 0.01%, further preferably 0.03%. The upper limit of C content is preferably lower than 0.3%, further preferably 0.15%.

Si: 0.01 to 2%

Silicon (Si) deoxidizes the steel. Furthermore, Si enhances the steam oxidation resistance of steel. On the other hand, if the Si content is too high, the toughness of steel is decreased. Further, since the oxide film contains Si, if the Si content is too high, the steel becomes liable to dissipate heat, and the photoselective absorptivity decreases. Therefore, the Si content is set to 0.01 to 2%. The lower limit of Si content is preferably higher than 0.01%, further preferably 0.05%, and still further preferably 0.1%. The upper limit of Si content is preferably lower than 2%, further preferably 1.0%, and still further preferably 0.5%.

Mn: 0.01 to 2%

Manganese (Mn) deoxidizes the steel. Furthermore, Mn forms MnS by combining with S in the base material, and therefore enhances the hot workability of steel. On the other hand, if the Mn content is too high, the steel is embrittled, and also the high-temperature strength of steel is decreased. Therefore, the Mn content is set to 0.01 to 2%. The lower limit of Mn content is preferably higher than 0.01%, further preferably 0.05%, and still further preferably 0.1%. The upper limit of Mn content is preferably lower than 2%, further preferably 1.0%, and still further preferably 0.8%.

P: at most 0.10%

S: at most 0.03%

Phosphorus (P) and sulfur (S) are impurities. P and S segregate at crystal grain boundaries in the base material, and decrease the hot workability of steel. Furthermore, P and S concentrate at the interface between the oxide film and the base material, and decrease the adhesiveness of oxide film. Therefore, the P content and the S content are preferably as low as possible. The P content is set to at most 0.10%, and the S content is set to at most 0.03%. The P content is preferably at most 0.03%, and the S content is preferably at most 0.015%.

Cr: 7.5 to 14.0%

Chromium (Cr) enhances the oxidation resistance of steel. Furthermore, Cr is contained in the oxide film, and enhances the photoselective absorptivity of steel. In particular, Cr enhances the reflectance on the high wavelength side, and contributes to the suppression of heat radiation of steel. Furthermore, Cr enhances the adhesiveness of steel relative to the oxide film. On the other hand, if the Cr content is too high, the amount of delta ferrite is increased, and therefore the strength and toughness of steel are decreased. Furthermore, much $Cr_2O_3$ is contained in the oxide film on the base material by oxidation treatment, and in particular, the light absorption on the low wavelength side is decreased. Therefore, the Cr content is set to 7.5 to 14.0%. The lower limit of Cr content is preferably higher than 7.5%, further preferably 7.7%, and still further preferably 8.0%. The upper limit of Cr content is preferably lower than 14.0%, further preferably 12.0%, and still further preferably 10.0%.

sol.Al: at most 0.3%

Aluminum (Al) deoxidizes the steel. On the other hand, if the Al content is too high, the cleanliness of steel is decreased, and the hot workability of steel is decreased. Therefore, the sol.Al content is set to at most 0.3%. The lower limit of sol.Al content is preferably 0.001%. The upper limit of sol.Al content is preferably lower than 0.3%, further preferably 0.1%. The sol.Al means acid soluble Al.

N: 0.005 to 0.15%

Nitrogen (N) solid-solution strengthens the steel. Furthermore, N forms nitrides and/or carbo-nitrides, and therefore precipitation strengthens the steel. On the other hand, if the N content is too high, the nitrides and carbo-nitrides are coarsened, and the toughness of steel is decreased. Therefore, the N content is set to 0.005 to 0.15%. The lower limit of N content is preferably higher than 0.005%, further preferably 0.01%. The upper limit of N content is preferably lower than 0.15%, further preferably 0.10%.

The balance of the base material of the heat resistant ferritic steel in accordance with this embodiment consists of Fe and impurities. The term "impurities" so referred to in this description indicates the elements that are mixed on account of ore or scrap used as a raw material of steel, environments in the process of production, and the like. An impurity is, for example, oxygen (O).

Furthermore, the base material of the heat resistant ferritic steel in accordance with this embodiment may contain one or more elements selected from the following first to fourth groups in lieu of some of Fe.

First group: Cu: at most 5%, Ni: at most 5%, and Co: at most 5%

Second group: Ti: at most 1.0%, V: at most 1.0%, Nb: at most 1.0%, Zr: at most 1.0%, and Hf: at most 1.0%

Third group: Mo: at most 5%, Ta: at most 5%, W: at most 5%, and Re: at most 5%

Fourth group: Ca: at most 0.1%, Mg: at most 0.1%, B: at most 0.1%, and rare earth metal (REM): at most 0.1%

First Group: Cu: At Most 5%, Ni: At Most 5%, and Co: At Most 5%

All of copper (Cu), nickel (Ni), and cobalt (Co) are selective elements. These elements are austenite stabilizing elements, and restrain the formation of delta ferrite. If at least one of these elements is contained even a little, the above-described effect can be achieved. On the other hand, if the contents of these elements are too high, the creep strength on the long time side is decreased. Therefore, the Cu content is set to at most 5%, the Ni content is set to at most 5%, and the Co content is set to at most 5%. The lower limit of the content of each of these elements is preferably 0.005%. The upper limit of each of these elements is preferably lower than 5%, further preferably 3%, and still further preferably 1%.

Second Group: Ti: At Most 1.0%, V: At Most 1.0%, Nb: At Most 1.0%, Zr: At Most 1.0%, and Hf: At Most 1.0%

All of titanium (Ti), vanadium (V), niobium (Nb), zirconium (Zr), and Hafnium (Hf) are selective elements. These elements form carbides, nitrides, and carbo-nitrides, and precipitation strengthen the steel. If at least one of these elements is contained even a little, the above-described effect can be achieved. On the other hand, if the contents of these elements are too high, the workability of steel is decreased. Therefore, the Ti content is set to at most 1.0%, the V content is set to at most 1.0%, the Nb content is set to at most 1.0%, the Zr content is set to at most 1.0%, and the Hf content is set to at most 1.0%. The lower limit of the content of each of these elements is preferably 0.01%. The upper limit of the content of each of these elements is preferably lower than 1.0%, further preferably 0.8%, and still further preferably 0.4%.

Third Group: Mo: At Most 5%, Ta: At Most 5%, W: At Most 5%, and Re: At Most 5%

All of molybdenum (Mo), tantalum (Ta), tungsten (W), and rhenium (Re) are selective elements. All of these elements enhance the strength of steel. If at least one of these elements is contained even a little, the above-described effect can be achieved. On the other hand, if the contents of these elements are too high, the toughness, ductility, and workability of steel are decreased. Therefore, the Mo content is set to at most 5%, the Ta content is set to at most 5%, the W content is set to at most 5%, and the Re content is set to at most 5%. The lower limit of the content of each of these elements is preferably 0.01%, further preferably 0.1%. The upper limit of the content of each of these elements is preferably lower than 5%, further preferably 4%, and still further preferably 3%.

Fourth Group: Ca: At Most 0.1%, Mg: At Most 0.1%, B: At Most 0.1%, and Rare Earth Metal (REM): At Most 0.1%

All of calcium (Ca), magnesium (Mg), boron (B), and rare earth metal (REM) are selective elements. All of these elements enhance the strength, workability, and oxidation resistance of steel. If at least one of these elements is contained even a little, the above-described effects can be achieved. On the other hand, if the contents of these elements are too high, the toughness and weldability of steel are decreased. Therefore, the Ca content is set to at most 0.1%, the Mg content is set to at most 0.1%, the B content is set to at most 0.1%, and the REM content is set to at most 0.1%. The lower limit of the content of each of these elements is preferably 0.0015%. The upper limit of the content of each of these elements is preferably lower than 0.1%, further preferably 0.05%. The "REM" is the general term of seventeen elements in which yttrium (Y) and scandium (Sc) are added to the elements ranging from lanthanum (La) of atomic number 57 to lutetium (Lu) of atomic number 71 in the periodic table.

[Oxide Film]

The oxide film of the heat resistant ferritic steel in accordance with this embodiment is formed on the base material. The heat resistant ferritic steel in accordance with this embodiment has excellent photoselective absorptivity because of having the oxide film explained below.

[Chemical Composition of Oxide Film]

The oxide film consists of oxides. The chemical composition of oxide film contains 25 to 97% of Fe and 3 to 75% of Cr. The content of chemical composition of oxide film described here is a content excluding oxygen (O) and carbon (C). Other than Fe and Cr, about 5% or less of an element of Al, Si, Ti, Mn, Nb or the like having a high affinity to oxygen may be contained. The heat resistant ferritic steel can attain excellent oxidation resistance and photoselective absorptivity because the oxide film has the above-described chemical composition, especially because the Cr content meets the condition of the above-described content range.

The chemical composition of oxide film can be measured by subjecting the base material having the oxide film to EDX (energy dispersive X-ray spectroscopy) from the surface thereof. The chemical composition is determined from the detected elements excluding oxygen (O) and carbon (C) as described above.

The preferable chemical composition contains 50 to 95% of Fe and 5 to 50% of Cr. The further preferable chemical composition contains 70 to 95% of Fe and 5 to 30% of Cr.

[Structure of Oxide Film]

The oxide film contains a plurality of oxides. Preferably, the oxide film mainly contains spinel-type oxides and $Cr_2O_3$. The term "mainly" described here means that, in the case where the cross section in the thickness direction of oxide film is microscopically observed, the area ratio of the spinel-type oxides and $Cr_2O_3$ is 60% or more of the whole oxide film.

The oxide film may contain oxides containing Al, Si Ti, Mn, and Nb in addition to spinel-type oxides and $Cr_2O_3$. If the oxide film contains spinel-type oxides and $Cr_2O_3$, the heat resistant ferritic steel can have excellent photoselective absorptivity. More specifically, by causing the oxide film to contain $Cr_2O_3$, the reflectance on the high wavelength side is further enhanced, and the radiation of heat in high-temperature environments is restrained.

The oxides in the oxide film are identified by XRD (X-ray diffractometry) in which X-rays are applied to the surface of the base material having the oxide film (heat resistant ferritic steel). In the XRD, a Co bulb may be used as an X-ray bulb, or any other bulbs may be used.

Preferably, the heat resistant ferritic steel satisfies Formula (1):

$$0.010 \leq Ic/Is \leq 10 \quad (1)$$

where Is means the maximum diffraction peak intensity of spinel-type oxides in the oxide film, which is obtained by XRD. The symbol Ic means the maximum diffraction peak intensity of $Cr_2O_3$ in the oxide film. The maximum diffraction peak intensity so referred to in this description corresponds, for spinel-type oxides, to the intensity on the (311) plane, and corresponds, for $Cr_2O_3$, to the intensity on the (104) plane. Generally, the volume ratio of each of oxides is determined from the integration of peak intensities. However, as described above, if the oxide film satisfies Formula (1) defined by the maximum diffraction peak intensity ratio, the heat resistant ferritic steel exhibits excellent photoselective absorptivity.

It is defined that IR1=Ic/Is. If IR1 is less than 0.010, the ratio of $Cr_2O_3$ in the oxide film is excessively low. Therefore, the photoselective absorptivity decreases. In particular, the reflectance on the high wavelength side decreases. Furthermore, the oxidation resistance of the heat resistant ferritic steel decreases.

On the other hand, if IR1 exceeds 10, the ratio of $Cr_2O_3$ in the oxide film is excessively high. In this case, although the oxidation resistance of the heat resistant ferritic steel increases, the photoselective absorptivity decreases remarkably.

If IR1 satisfies Formula (1), the heat resistant ferritic steel is liable to absorb light, and is less liable to dissipate heat. Specifically, the reflectance on the low wavelength side decreases, and the reflectance on the high wavelength side increases. The lower limit of IR1 is preferably higher than 0.010, further preferably 0.020, and still further preferably 0.050. The upper limit of IR1 is preferably lower than 10, further preferably 7, and still further preferably 5.

For the oxide film in accordance with this embodiment, the content of $Fe_2O_3$ is preferably lower. If the content of $Fe_2O_3$ is high, the reflectance of light (electromagnetic wave) on the low wavelength side of oxide film increases, and the reflectance of light on the high wavelength side decreases. That is to say, the photoselective absorptivity of oxide film decreases. Therefore, the content of $Fe_2O_3$ is preferably lower.

More specifically, the oxide film of the heat resistant ferritic steel preferably satisfies Formula (2):

$$Ih/(Is+Ic) \leq 0.05 \quad (2)$$

where Ih means the maximum diffraction peak intensity of $Fe_2O_3$ in the oxide film. The maximum diffraction peak intensity so referred to in this description corresponds, for $Fe_2O_3$, to the intensity on the (104) plane. Generally, the volume ratio of each of oxides is determined from the integration of peak intensities. However, as described above, if the oxide film satisfies Formula (2) defined by the maximum diffraction peak intensity ratio, the heat resistant ferritic steel exhibits quite excellent photoselective absorptivity.

It is defined that IRh=Ih/(Is+Ic). If IRh is 0.05 or less, the ratio of $Fe_2O_3$ in the oxide film is sufficiently low. Therefore, the heat resistant ferritic steel is liable to absorb light, and less liable to dissipate heat. Specifically, the reflectance on the low wavelength side decreases, and the reflectance on the high wavelength side increases. The lower limit of IRh is preferably lower than 0.05, further preferably 0.010, and still further preferably 0.005.

The oxide film in accordance with this embodiment may contain FeO (wustite). Wustite is less liable to appear on the surface of oxide film because it is formed on the base material side as compared with magnetite, which is a spinel-type oxide. That is to say, wustite is less liable to be formed in the outermost layer of oxide film. Therefore, wustite does not substantially exert an influence on the photoselective absorptivity. Therefore, the oxide film may contain or need not contain wustite.

[Production Method]

There is explained one example of a method for producing the heat resistant ferritic steel in accordance with this embodiment.

The method for producing the heat resistant ferritic steel in accordance with this embodiment includes a step of preparing the base material (base material preparing step) and a step of oxidizing the prepared base material to form the oxide film on the base material (oxidizing step). In the following, the base material preparing step and the oxidizing step are described in detail.

[Base Material Preparing Step]

A starting material having the above-described chemical composition is prepared. The starting material may be a slab, bloom, or billet produced by the continuous casting process (including the round continuous casting). Also, the starting material may be a billet produced by hot-working an ingot produced by the ingot-making process, or may be a billet produced by hot-working a slab or bloom.

The prepared starting material is charged into a heating furnace or a soaking pit, and is heated. The heated starting material is hot-worked to produce the base material. For example, as the hot working, the Mannesmann process is carried out. Specifically, the starting material is piercing-rolled by using a piercing machine to form a material pipe. Successively, the starting material is elongation-rolled and sized by using a mandrel mill and a sizing mill to produce the base material as a seamless steel pipe. As the hot working, the hot-extrusion process or the hot forging process may be carried out to produce the base material. As necessary, the base material produced by hot working may be subjected to heat treatment, or may be subjected to cold working. The cold working is, for example, cold rolling or cold drawing. By the above-described step, the base material as a seamless pipe is produced.

The base material may be a steel plate. In this case, the base material used as a steel plate is produced by hot-working the starting material. Also, the base material used as a bar steel may be produced by hot working. Further, the base material used as a welded steel pipe may be produced by welding a steel plate.

[Oxidizing Step]

Successively, the oxide film is formed on the produced base material. The oxide film is produced, for example, by the method described below.

The base material is subjected to oxidation treatment. The oxidation treatment is performed in a gas atmosphere of, for example, mixed gas or combustion gas. The preferable oxidation treatment temperature is 1150° C. or lower, and the preferable oxidation treat time is 3 hours or shorter.

If the oxidation treatment temperature is too high, the ratio of the spinel-type oxides in the oxide film increases excessively, and the ratio of $Cr_2O_3$ decreases excessively. If the oxidation treatment temperature is too low, the oxide film is formed unevenly on the base material, and in some cases, the oxide film cannot cover the base material. For this reason, the photoselective absorptivity decreases. Therefore, the preferable oxidation treatment temperature is 500° C. to 1150° C.

Preferably, by controlling the gas atmosphere of oxidation treatment, and by changing the structure of oxide film, an oxide film satisfying Formula (2) can be obtained. More specifically, it is preferable that the oxygen partial pressure $Po_2$ (atm) in the gas atmosphere of oxidation treatment satisfy Formula (3).

$$Po_2 \leq 2.76 \times 10^{15} \leq \exp\{-493.6 \times 10^3/(RT)\} \quad (3)$$

If $Po_2$ satisfies Formula (3), the oxygen partial pressure in the gas atmosphere thermodynamically becomes lower than the oxygen partial pressure necessary for steady formation of $Fe_2O_3$. Therefore, the formation of $Fe_2O_3$ is restricted. In the case where composition fluctuations caused by a gas flow in the gas atmosphere and composition fluctuations on account of combustion state are considered, further preferably, the oxygen partial pressure $Po_2$ satisfies Formula (4).

$$Po_2 \leq 1.00 \times 10^{14} \times \exp\{-493.6 \times 10^3/(RT)\} \quad (4)$$

Concerning the gas atmosphere of oxidation treatment, for example, the air-fuel ratio of combustion gas may be controlled. Specifically, if the air-fuel ratio is controlled, the gas composition in the gas atmosphere changes. Based on the gas composition in the oxidation treatment gas atmosphere, the oxygen partial pressure is determined. Based on the gas composition, the oxygen partial pressure can be calculated by using, for example, the thermodynamic computation software "MALT-2 for WIN".

As a fuel, natural gas, methane, propane, butane, or the like may be used. Also, a mixed gas such as $H_2$—$H_2O$ or CO—$CO_2$ may be used. Further, an oxidation treatment gas atmosphere in which these gases are mixed may be used.

Oxidation treatment that doubles as normalizing treatment (normalizing) may be performed. In this case, the cold-rolled base material is normalized. The preferable oxidation treatment temperature in this case is 900° C. or higher. The oxidation treatment time is preferably 30 minutes or shorter, further preferably 20 minutes or shorter. If the oxidation treatment temperature is too high and if the oxidation treatment time is too long, the oxide film becomes excessively thick. In this case, the adhesiveness between oxide film and base material decreases, and the oxide film sometimes peels off. For this reason, the photosensitive absorptivity of the heat resistant ferritic steel decreases.

Oxidation treatment that doubles as tempering treatment (low-temperature annealing) may be performed. In this case, the normalized base material is subjected to the oxidation treatment that doubles as tempering treatment. In this case, the preferable oxidation treatment temperature is 650 to 850° C., and the preferable oxidation treatment time is 2 hours or shorter.

The oxidation treatment may be performed after the normalizing treatment and tempering treatment. In this case, it is preferable that the base material structure formed by the normalizing treatment and tempering treatment be not changed in property. For this reason, the preferable oxidation treatment temperature is not higher than the tempering treatment temperature. Since the oxidation treatment temperature is as low as not higher than the tempering treatment temperature, the oxidation rate is low. Therefore, the oxidation treatment time may be long. However, considering the productivity, the preferable oxidation treatment time is 3 hours or shorter.

The oxide film may be formed on the whole surface of base material. However, the oxide film may be formed only on the surface required to be excellent in photoselective absorptivity, such as the outer peripheral surface of a pipe, which is the base material.

The above-described oxidation treatment may be performed one time or a plurality of times. After each step of normalizing treatment, tempering treatment, and oxidation treatment, straightening or the like may be performed mechanically. In the case where oil or dirt sticks to the surface of oxide film formed on the base material, even if the treatment of degreasing or cleaning is performed, the properties of oxide film are not changed.

In the above-described oxidation treatment, the composition of oxide film can be changed by controlling the concentration of combustion gas. By following the above-described steps, the heat resistant ferritic steel having the base material and the oxide film of this embodiment can be produced.

In the above-described oxidation treatment step, if $Fe_2O_3$ (hematite) is formed on the outermost layer of oxide film as the result that the oxygen partial pressure $P_{O_2}$ in the gas atmosphere of oxidation treatment does not satisfy Formula (3), the $Fe_2O_3$ (hematite) may be removed by shotblasting treatment. Even in this case, the oxide film containing magnetite, spinel-type oxides, and $Cr_2O_3$ of this embodiment is formed.

Example 1

Heat resistant ferritic steels having various chemical compositions were produced, and the photoselective absorptivity thereof was examined.

[Examination Method]

Heat resistant ferritic steels of steel Nos. 1 to 9 having the chemical compositions given in Table 1 were melted to produce ingots.

TABLE 1

| Steel No. | Chemical composition (mass %, balance being Fe and impurities) | | | | | | | | |
|---|---|---|---|---|---|---|---|---|---|
| | C | Si | Mn | P | S | Cr | sol. Al | N | Others |
| 1 | 0.11 | 0.32 | 0.41 | 0.011 | 0.003 | 9.4 | 0.01 | 0.04 | — |
| 2 | 0.11 | 0.25 | 0.4 | 0.015 | <0.001 | 8.9 | <0.01 | 0.04 | 0.2V, 0.9Mo |
| 3 | 0.04 | 0.34 | 0.54 | 0.011 | 0.002 | 9.2 | <0.01 | 0.05 | 2Co, 2.4W |
| 4 | 0.08 | 0.21 | 0.56 | 0.023 | 0.002 | 9.1 | 0.03 | 0.01 | 0.02Nd, 2.9W, 0.2Ni |
| 5 | 0.04 | 1.12 | 0.14 | 0.029 | 0.001 | 13.2 | 0.08 | 0.02 | 0.6Nb |
| 6 | 0.1 | 0.24 | 0.35 | 0.016 | <0.001 | 9.2 | <0.01 | 0.05 | 0.2V, 0.4Mo, 1.8W |
| 7 | 0.18 | 0.35 | 1.08 | 0.008 | 0.005 | 8.3 | 0.03 | 0.01 | 2.5Re, 0.14Ti |
| 8 | 0.11 | 0.16 | 0.45 | 0.013 | 0.001 | 15.4* | 0.02 | 0.02 | 1.6Cu, 1.5Mo, 1.3Ni |
| 9 | 0.09 | 0.21 | 0.42 | 0.015 | 0.001 | 7.0* | 0.04 | 0.01 | 2.1W, 0.15V |

*indicates deviation from range specified in present invention.

Referring to Table 1, for steels of steel Nos. 1 to 7, the chemical composition of base material was within the range of chemical composition of the present invention. On the other hand, for steels of steel Nos. 8 and 9, the chemical composition of base material was out of the range of chemical composition of the present invention. Specifically, the Cr content of steel No. 8 exceeded the upper limit of Cr content of the base material of the present invention. The Cr content of steel No. 9 was lower than the lower limit of Cr content of the base material of the present invention.

Each of the produced ingots was hot-rolled and cold-rolled to produce a base material. In this example, the base material was a steel plate. The produced base material was subjected to oxidation treatment under various conditions to form an oxide film on the surface of base material. Table 2 gives steel No. used in each of test Nos. and oxidation treatment conditions.

TABLE 2

| Test No. | Steel No. | Oxidation treatment Temperature × time | Oxide film Chemical composition (%) | Oxide film Oxides | Maximum diffraction peak intensity ratio IR1 = Ic/Is | Maximum diffraction peak intensity ratio IRh = Ih/(Is + Ic) | Reflectance (%) 0.5 µm | Reflectance (%) 10 µm |
|---|---|---|---|---|---|---|---|---|
| 1 | 1 | 1050° C. × 10 min | Fe: 50, Cr: 46 | Spinel, $Cr_2O_3$ | 3.333 | <0.005 | 8 | 60 |
| 2 | 1 | 1050° C. × 10 min | Fe: 95, Cr: 3 | Spinel, $Cr_2O_3$ | 0.008 | <0.005 | 2 | 33 |
| 3 | 2 | 1050° C. × 10 min | Fe: 72, Cr: 25 | Spinel, $Cr_2O_3$ | 1.111 | <0.005 | 4 | 65 |
| 4 | 2 | 750° C. × 60 min | Fe: 88, Cr: 8 | Spinel, $Cr_2O_3$ | 0.025 | <0.005 | 3 | 46 |
| 5 | 2 | 600° C. × 60 min | Fe: 76, Cr: 22 | Spinel, $Cr_2O_3$ | 0.526 | <0.005 | 6 | 62 |

TABLE 2-continued

| Test No. | Steel No. | Oxidation treatment Temperature × time | Oxide film Chemical composition (%) | Oxides | Maximum diffraction peak intensity ratio IR1 = Ic/Is | IRh = Ih/(Is + Ic) | Reflectance (%) 0.5 μm | 10 μm |
|---|---|---|---|---|---|---|---|---|
| 6 | 2 | 1050° C. × 30 min | Fe: 80, Cr: 16 | Spinel, $Cr_2O_3$ | 0.074 | <0.005 | 4 | 58 |
| 7 | 3 | 1050° C. × 10 min | Fe: 82, Cr: 17 | Spinel, $Cr_2O_3$ | 0.119 | <0.005 | 6 | 55 |
| 8 | 4 | 780° C. × 45 min | Fe: 72, Cr: 25 | Spinel, $Cr_2O_3$ | 0.064 | <0.005 | 4 | 48 |
| 9 | 5 | 1120° C. × 5 min | Fe: 78, Cr: 20 | Spinel, $Cr_2O_3$ | 0.526 | <0.005 | 6 | 46 |
| 10 | 7 | 730° C. × 30 min | Fe: 27, Cr: 70 | Spinel, $Cr_2O_3$ | 6.667 | <0.005 | 9 | 65 |
| 11 | 4 | 1070° C. × 10 min | Fe: 96, Cr: 4 | Spinel, $Cr_2O_3$, $Fe_2O_3$ | 0.015 | 0.079 | 8 | 35 |
| 12 | 6 | 1060° C. × 10 min | Fe: 96, Cr: 3 | Spinel, $Cr_2O_3$, $Fe_2O_3$ | 0.013 | 0.058 | 8 | 37 |
| 13 | 6 | 1160° C. × 15 min | Fe: 98, Cr: 1* | Spinel, $Cr_2O_3$ | 0.007 | <0.005 | 4 | 14* |
| 14 | 8* | 1060° C. × 10 min | Fe: 10, Cr: 88* | Spinel, $Cr_2O_3$ | 25.000 | <0.005 | 19* | 20* |
| 15 | 9* | 1060° C. × 10 min | Fe: 98, Cr: <0.1* | Spinel | <0.001 | <0.005 | 4 | 10* |

*indicates deviation from range specified in present invention.

Referring to Table 2, for test Nos. 1 to 3, 6, 7, 9, and 11 to 15, oxidation treatment that doubles as normalizing treatment was performed. Specifically, the oxidation treatment was performed under the conditions of oxidation treatment temperature of 900 to 1160° C. and oxidation treatment time of 30 minutes or shorter.

The oxygen partial pressure $Po_2$ in a gas atmosphere in the oxidation treatment of each test No. did not satisfy Formula (3). Therefore, concerning test Nos. 1 to 3, 6, 7, 9, and 13 to 15, after the oxidation treatment, the surface of oxide film was ground thin by shotblasting to remove hematite. On the other hand, for test Nos. 11 and 12, shotblasting was not performed.

For test Nos. 4, 8, and 10, oxidation treatment that doubles as tempering treatment was performed. Specifically, the oxidation treatment was performed under the conditions of oxidation treatment temperature of 650 to 850° C. and oxidation treatment time of 2 hours or shorter. For test No. 5, the oxidation treatment was performed assuming the oxidation treatment after normalizing treatment and tempering treatment. Specifically, the oxidation treatment was performed under the conditions of oxidation treatment temperature of 600° C. and oxidation treatment time of 60 minutes.

As described above, the oxygen partial pressure $PO_2$ in a gas atmosphere in the oxidation treatment of each test No. did not satisfy Formula (3). Therefore, for test Nos. 4, 5, 8 and 10 as well, after the oxidation treatment, shotblasting was performed to grind the surface of oxide film thin, whereby hematite was removed.

[Analysis of Chemical Composition of Oxide Film]

The chemical composition of oxide film of each test No. was measured by the method described below. From the steel plate of each test No., a test specimen including the oxide film was sampled. Of the test specimen, on the surface of oxide film, the chemical composition of oxide film was analyzed by EDX. Then, the compositions of detected elements excluding oxygen and carbon were determined. Table 2 gives the chemical composition of oxide film produced for each test No.

[Identification of Oxides Forming Oxide Film]

The structure of oxide film of each test No. was identified by the method described below. From the steel plate of each test No., a test specimen including the oxide film was sampled. On the surface on which the oxide film is formed, the oxides forming the oxide film were identified by XRD. In the XRD, a Co bulb was used. The identified oxides are given in Table 2.

Furthermore, from the obtained X-ray diffraction spectrum, the maximum diffraction peak intensity Is of spinel-type oxides, the maximum diffraction peak intensity Ic of $Cr_2O_3$, and the maximum diffraction peak intensity Ih of hematite were measured. By using the obtained Is, Ic, and Ih, IR1 (=Ic/Is) and IRh=Ih/(Is+Ic) were determined. The determined IR1 and IRh are given in Table 2.

[Photoselective Absorptivity Evaluation Test]

The photoselective absorptivity of the steel plate of each test No. was evaluated by the evaluation test described below. The reflectance on the low wavelength side (wavelength: 0.3 to 1.0 μm, visual to near-infrared region) of each test No. and the reflectance on the high wavelength side (wavelength: 2.5 to 25 μm, medium- to far-infrared region) were measured. Specifically, for the reflectance on the low wavelength side, the reflectance of light having a wavelength of 0.5 μm was measured by using a UV-Vis device (Cary 4000 spectrophotometer manufactured by VARIAN Inc.). For the reflectance on the high wavelength side, the reflectance of light having a wavelength of 10 μm was measured by using an FT-IR device (Varian 670-IR spectrometer manufactured by VARIAN Inc.).

For light on the low wavelength side, high absorptivity is required. Therefore, on the low wavelength side, lower reflectance is preferable. On the other hand, for light on the high wavelength side, low radioactivity is required. Therefore, on the high wavelength side, higher reflectance is preferable. In this example, in the case where the reflectance on the low wavelength side (light having a wavelength of 0.5 μm) is 10% or lower, and the reflectance on the high wavelength side (light having a wavelength of 10 μm) is 30% or higher, it was evaluated that "the photoselective absorptivity is high". On the other hand, in the case where either the reflectance on the high wavelength side or the reflectance on the low wavelength side does not meet the above-described condition, it was evaluated that "the photoselective absorptivity is low".

[Test Results]

Table 2 gives test results. The term "spinel" in the "oxides" column in Table 2 means that the oxide film of the corresponding test No. contains spinel-type oxides. The terms "spinel, $Cr_2O_3$" mean that the oxide film contains spinel-type oxides and $Cr_2O_3$. The terms "spinel, $Cr_2O_3$, $Fe_2O_3$" mean that the oxide film contains spinel-type oxides, $Cr_2O_3$, and $Fe_2O_3$.

Referring to Table 2, for test Nos. 1 to 12, the chemical composition of base material was within the range of the present invention, and the chemical composition of oxide film was within the range of the present invention. Also, the oxide film contained spinel-type oxides and the like and $Cr_2O_3$. Therefore, the reflectance on the low wavelength side was 10% or lower, the reflectance on the high wavelength side was 30% or higher, and excellent photoselective absorptivity was exhibited.

Furthermore, test Nos. 1 and 3 to 12 satisfied Formula (1). Therefore, the photoselective absorptivity, especially, the reflectance on the high wavelength side was as high as 35% or more. On the other hand, test No. 2 did not satisfy Formula (1), so that the reflectance on the high wavelength side was 35% or lower. For test No. 2, the spinel-type oxides contained much Cr, and the ratio of $Cr_2O_3$ was low. Therefore, it is thought that the reflectance on the high wavelength side was low as compared with test Nos. 1 and 3 to 12.

Furthermore, test Nos. 1 and 3 to 10 satisfied Formula (2). Therefore, the photoselective absorptivity, especially, the reflectance on the high wavelength side was as high as 40% or more. On the other hand, test Nos. 11 and 12 did not satisfy Formula (2), so that the reflectance on the high wavelength side was lower than 40%. In the oxide films of test Nos. 11 and 12, the ratio of the content of $Fe_2O_3$ to the contents of spinel-type oxides and $Cr_2O_3$ was high. Therefore, it is thought that the reflectance on the high wavelength side was low as compared with test Nos. 1 and 3 to 10.

For test No. 13, the chemical composition of base material was within the range of the present invention. However, the Cr content of oxide film was lower than the lower limit of the present invention, and IR1 did not satisfy Formula (1). As a result, the reflectance on the high wavelength side was low, and the photoselective absorptivity was low. For test No. 13, the oxidation treatment temperature was high. Therefore, it is thought that the ratio of $Cr_2O_3$ in the oxide film was low, and resultantly, the photoselective absorptivity was low.

For test No. 14, the Cr content of base material exceeded the upper limit of the present invention. Therefore, the chemical composition of oxide film was out of the range of the present invention. Specifically, the content of Fe in the oxide film was lower than the lower limit of the present invention, and the content of Cr exceeded the upper limit of the present invention. Furthermore, IR1 exceeded the upper limit of Formula (1). Therefore, the reflectance on the low wavelength side exceeded 10%, the reflectance on the high wavelength side was lower than 30%, and the photoselective absorptivity was low. It is thought that the photoselective absorptivity was low because the ratio of $Cr_2O_3$ in the oxide film was too high.

For test No. 15, the Cr content of base material was lower than the lower limit of the present invention. Therefore, the content of Fe in the oxide film exceeded the upper limit of the present invention, and the content of Cr was lower than the lower limit of the present invention. Furthermore, IR1 was less than the lower limit of Formula (1). Therefore, the reflectance on the high wavelength side was lower than 300, and the photoselective absorptivity was low. It is thought that the steel was liable to dissipate heat because the ratio of $Cr_2O_3$ in the oxide film was too low.

Example 2

Heat resistant ferritic steels having various chemical compositions were produced, and the photoselective absorptivity thereof was examined.

[Examination Method]

Heat resistant ferritic steels of steel Nos. 10 to 20 having the chemical compositions given in Table 3 were melted to produce ingots.

TABLE 3

| Steel No. | Chemical composition (mass %, balance being Fe and impurities) | | | | | | | | |
|---|---|---|---|---|---|---|---|---|---|
| | C | Si | Mn | P | S | Cr | sol. Al | N | Others |
| 10 | 0.11 | 0.32 | 0.41 | 0.011 | 0.003 | 9.4 | 0.01 | 0.04 | — |
| 11 | 0.11 | 0.25 | 0.40 | 0.015 | <0.001 | 8.9 | <0.01 | 0.04 | 0.2V, 0.9Mo |
| 12 | 0.08 | 0.15 | 0.48 | 0.009 | 0.002 | 9.0 | 0.02 | 0.03 | 0.5Mo, 1.9W, 0.06Nb, 0.004B |
| 13 | 0.08 | 0.25 | 0.49 | 0.011 | 0.004 | 9.1 | 0.02 | 0.01 | 2.8Ta, 2.6Co, 0.05Zr, 0.02Ca |
| 14 | 0.06 | 0.14 | 0.32 | 0.011 | 0.001 | 8.6 | 0.01 | 0.09 | 0.03Nd |
| 15 | 0.03 | 0.75 | 0.14 | 0.029 | 0.001 | 9.5 | 0.08 | 0.02 | 0.2Ti, 0.5Nb |
| 16 | 0.08 | 0.27 | 0.51 | 0.013 | <0.001 | 9.1 | <0.01 | 0.08 | 2.2Re, 0.02Mg |
| 17 | 0.18 | 0.35 | 1.08 | 0.008 | 0.005 | 8.3 | 0.03 | 0.01 | 2.5W, 0.3Hf |
| 18 | 0.11 | 0.19 | 0.65 | 0.012 | 0.001 | 11.6 | 0.02 | 0.03 | 0.3Ni, 1.5Cu |
| 19 | 0.11 | 0.16 | 0.45 | 0.013 | 0.001 | 15.4* | 0.02 | 0.02 | 1.6Cu, 1.5Mo, 1.3Ni |
| 20 | 0.15 | 2.12* | 1.12 | 0.012 | 0.002 | 8.4 | 0.01 | 0.01 | 0.9W, 0.18V |

*indicates deviation from range specified in present invention.

Referring to Table 3, for steels of steel Nos. 10 to 18, the chemical composition of base material was within the range of chemical composition of the present invention. On the other hand, for steels of steel Nos. 19 and 20, the chemical composition of base material was out of the range of chemical composition of the present invention. Specifically, the Cr content of steel No. 10 exceeded the upper limit of Cr content of the base material of the present invention. The Si content of steel No. 11 exceeded the upper limit of Si content of the base material of the present invention.

From each of the produced ingots, a base material (steel plate) was produced as in Example 1. The produced base material was subjected to oxidation treatment under various conditions to form an oxide film on the surface of base material. Table 4 gives steel No. used in each of test Nos. and oxidation treatment conditions. more, from the obtained X-ray diffraction spectrum, the maximum diffraction peak intensity Is of spinel-type oxides,

TABLE 4

| Test No. | Steel No. | Oxidation treatment Temperature × time | $P_{O_2}$ (atm) | $P_{ref}$ (atm) | Oxide film Chemical composition | Oxides | Maximum diffraction peak intensity ratio IR1 = Ic/Is | IRh = Ih/(Is + Ic) | Reflectance (%) 0.5 μm | 10 μm |
|---|---|---|---|---|---|---|---|---|---|---|
| 21 | 10 | 1020° C. × 30 min | $2.5 \times 10^{-12}$ | $3.2 \times 10^{-5}$ | Fe: 70, Cr: 28 | Spinel, $Cr_2O_3$ | 1.111 | <0.005 | 6 | 62 |
| 22 | 11 | 1050° C. × 10 min | $6.5 \times 10^{-12}$ | $9.0 \times 10^{-5}$ | Fe: 71, Cr: 26 | Spinel, $Cr_2O_3$ | 1.053 | <0.005 | 5 | 64 |
| 23 | 11 | 1050° C. × 10 min | $3.5 \times 10^{-7}$ | $9.0 \times 10^{-5}$ | Fe: 88, Cr: 10 | Spinel, $Cr_2O_3$, $Fe_2O_3$ | 0.222 | 0.02 | 9 | 50 |
| 24 | 11 | 1050° C. × 10 min | $5.8 \times 10^{-1}$ | $9.0 \times 10^{-5}$ | Fe: 94, Cr: 4 | Spinel, $Cr_2O_3$, $Fe_2O_3$ | 0.111 | 0.25 | 9 | 35 |
| 25 | 12 | 1060° C. × 10 min | $4.6 \times 10^{-6}$ | $1.3 \times 10^{-4}$ | Fe: 75, Cr: 21 | Spinel, $Cr_2O_3$ | 0.526 | <0.005 | 6 | 62 |
| 26 | 12 | 720° C. × 60 min | $3.9 \times 10^{-19}$ | $3.0 \times 10^{-11}$ | Fe: 82, Cr: 17 | Spinel, $Cr_2O_3$, $Fe_2O_3$ | 0.083 | 0.008 | 4 | 58 |
| 27 | 13 | 1050° C. × 10 min | $8.6 \times 10^{-11}$ | $9.0 \times 10^{-5}$ | Fe: 85, Cr: 12 | Spinel, $Cr_2O_3$ | 0.040 | <0.005 | 6 | 55 |
| 28 | 13 | 620° C. × 100 min | $4.2 \times 10^{-10}$ | $3.7 \times 10^{-14}$ | Fe: 93, Cr: 3 | Spinel, $Cr_2O_3$, $Fe_2O_3$ | 0.167 | 0.06 | 10 | 38 |
| 29 | 13 | 620° C. × 100 min | $6.5 \times 10^{-21}$ | $3.7 \times 10^{-14}$ | Fe: 80, Cr: 16 | Spinel, $Cr_2O_3$ | 0.077 | <0.005 | 6 | 60 |
| 30 | 14 | 980° C. × 5 min | $3.2 \times 10^{-9}$ | $7.3 \times 10^{-6}$ | Fe: 81, Cr: 17 | Spinel, $Cr_2O_3$ | 0.053 | <0.005 | 6 | 57 |
| 31 | 15 | 1150° C. × 3 min | $1.2 \times 10^{-11}$ | $2.1 \times 10^{-3}$ | Fe: 88, Cr: 8 | Spinel, $Cr_2O_2$ | 0.033 | <0.005 | 7 | 51 |
| 32 | 16 | 1080° C. × 15 min | $8.4 \times 10^{-11}$ | $2.4 \times 10^{-4}$ | Fe: 77, Cr: 20 | Spinel, $Cr_2O_3$ | 0.250 | <0.005 | 6 | 62 |
| 33 | 17 | 1050° C. × 10 min | $2.5 \times 10^{-12}$ | $9.0 \times 10^{-5}$ | Fe: 67, Cr: 28 | Spinel, $Cr_2O_3$ | 1.500 | <0.005 | 5 | 64 |
| 34 | 18 | 1100° C. × 8 min | $3.4 \times 10^{-11}$ | $4.6 \times 10^{-4}$ | Fe: 80, Cr: 17 | Spinel, $Cr_2O_3$ | 0.074 | <0.005 | 5 | 58 |
| 35 | 19* | 1050° C. × 15 min | $2.5 \times 10^{-12}$ | $9.0 \times 10^{-5}$ | Fe: 17, Cr: 80* | Spinel, $Cr_2O_3$ | 6.250 | <0.005 | 16* | 28* |
| 36 | 20* | 1100° C. × 10 min | $3.4 \times 10^{-14}$ | $4.6 \times 10^{-4}$ | Fe: 20, Cr: 62* | Spinel, $Cr_2O_3$ | 2.250 | <0.005 | 9 | 25* |

*indicates deviation from range specified in present invention.

Referring to Table 4, for test Nos. 21 to 25, 27, 30, and 32 to 36, oxidation treatment that doubles as normalizing treatment was performed. Specifically, the oxidation treatment was performed under the conditions of oxidation treatment temperature of 980 to 1100° C. and oxidation treatment time of 30 minutes or shorter. For test No. 31, oxidation treatment that doubles as annealing treatment was performed. Specifically, the oxidation treatment was performed under the conditions of oxidation treatment temperature of 1150° C. and oxidation treatment time of 3 minutes.

For test No. 26, oxidation treatment that doubles as tempering treatment was performed. Specifically, the oxidation treatment was performed under the conditions of oxidation treatment temperature of 720° C. and oxidation treatment time of 60 minutes. For test Nos. 28 and 29, the oxidation treatment at low temperatures was performed assuming the oxidation treatment after normalizing treatment and tempering treatment. Specifically, the oxidation treatment was performed under the conditions of oxidation treatment temperature of 620° C. and oxidation treatment time of 100 minutes.

The oxygen partial pressure $P_{O_2}$ in the gas atmosphere of the oxidation treatment of each test No. was determined by using the thermodynamic computation software "MALT-2 for WIN" based on each gas composition obtained by gas analysis. Furthermore, it was defined that $P_{ref}=2.76 \times 10^{15} \times \exp\{-493.6 \times 10^3/(RT)\}$, and $P_{ref}$ for each test No. was determined. The determined $P_{O_2}$ and $P_{ref}$ are given in Table 4.

For test Nos. 21 to 23, 25 to 27, and 29 to 36, the oxygen partial pressure $P_{O_2}$ was lower than $P_{ref}$, and Formula (1) was satisfied. On the other hand, for test Nos. 24 and 28, the oxygen partial pressure $P_{O_2}$ was higher than $P_{ref}$, and Formula (1) was not satisfied.

[Identification of Oxides Forming Oxide Film]

The structure of oxide film of each test No. was identified by the same method as that of Example 1 (XRD). Furtherthe maximum diffraction peak intensity Ic of $Cr_2O_3$, and the maximum diffraction peak intensity Ih of $Fe_2O_3$ were measured, and IR1 and IRh were determined. The determined IR1 and IRh are given in Table 4.

[Photoselective Absorptivity Evaluation Test]

The photoselective absorptivity of the steel plate of each test No. was evaluated by the same evaluation test as that of Example 1.

[Test Results]

Table 4 gives test results.

Referring to Table 4, for test Nos. 21 to 34, the chemical composition of base material and the chemical composition of oxide film were within the range of the present invention, and the oxide film contained spinel-type oxides and $Cr_2O_3$. Furthermore, for these test Nos., IR1 satisfied Formula (1). Therefore, the reflectance on the low wavelength side was 10% or lower, the reflectance on the high wavelength side was 35% or higher, and excellent photoselective absorptivity was exhibited.

Furthermore, for test Nos. 21 to 23, 25 to 27, and 29 to 34, the oxygen partial pressure $P_{O_2}$ in the gas atmosphere at the time of oxidation treatment satisfied Formula (3). Therefore, for the oxide films of these test Nos, IRh satisfied Formula (2), and the reflectance on the high wavelength side was further higher, being 40% or higher. On the other hand, for test Nos. 24 and 28, the oxygen partial pressure $P_{O_2}$ did not satisfy Formula (3). Therefore, the reflectance on the low wavelength side was high, and the reflectance on the high wavelength side was low as compared with test Nos. 21 to 23, 25 to 27, and 29 to 34. In particular, the reflectance on the high wavelength side was lower than 40%.

For test No. 35, the Cr content of base material exceeded the upper limit of the present invention. Therefore, the reflectance on the low wavelength side exceeded 10%, the reflectance on the high wavelength side was lower than 40%, and the photoselective absorptivity was low. It is thought that the photoselective absorptivity was low because the ratio of $Cr_2O_3$ in the oxide film was too high.

For test No. 36, the Si content of base material exceeded the upper limit of the present invention. Therefore, the reflectance on the high wavelength side was lower than 30%, and the photoselective absorptivity was low. It is thought that the steel was liable to dissipate heat because an oxide film containing much Si was formed.

The above is the explanation of the embodiment of the present invention. The above-described embodiment is merely an illustration for carrying out the present invention. Therefore, the present invention is not limited to the above-described embodiment, and the above-described embodiment can be carried out by being modified as appropriate without departing from the spirit and scope of the present invention.

INDUSTRIAL APPLICABILITY

The heat resistant ferritic steel in accordance with this embodiment can be applied widely to applications in which photoselective absorptivity is required. In particular, the steel is suitable as a steel material for solar thermal power plant boilers.

The invention claimed is:

1. A heat resistant ferritic steel comprising:
a base material comprising, by mass percent, C: 0.01 to 0.3%, Si: 0.01 to 2%, Mn: 0.01 to 2%, P: at most 0.10%, S: at most 0.03%, Cr: 7.5 to 14.0%, sol. Al: at most 0.3%, and N: 0.005 to 0.15%, the balance being Fe and impurities, and
an oxide film which is formed on the base material and whose chemical composition excluding oxygen and carbon contains 25 to 97% of Fe and 3 to 75% of Cr, wherein
the oxide film contains spinel-type oxides and $Cr_2O_3$,
wherein the following Formulas (1) and (2) are satisfied:

$$0.010 \leq Ic/Is \leq 10 \quad (1)$$

$$Ih/(Is+Ic) \leq 0.05 \quad (2)$$

where the maximum diffraction peak intensity of $Cr_2O_3$ in the oxide film obtained by X-ray diffraction is Ic, and the maximum diffraction peak intensity of spinel-type oxides in the oxide film obtained by the X-ray diffraction is Is and where the maximum diffraction peak intensity of $Fe_2O_3$ in the oxide film obtained by the X-ray diffraction is Ih,
wherein the oxide film on the base material is formed by oxidizing the base material at a temperature of 500 to 1150° C. in a gas atmosphere in which an oxygen partial pressure $Po_2$ (atm) satisfies Formula (3):

$$Po_2 \leq 2.76 \times 10^{15} \times \exp\{-493.6 \times 10^3/(RT)\} \quad (3)$$

where R is a gas constant whose unit is $J \cdot K^{-1} \cdot mol^{-1}$, and T is a temperature whose unit is K.

2. The heat resistant ferritic steel according to claim 1, wherein
the base material further comprises one or more elements selected from first to fourth groups in lieu of some of Fe:
first group: Cu: at most 5%, Ni: at most 5%, and Co: at most 5%;
second group: Ti: at most 1.0%, V: at most 1.0%, Nb: at most 1.0%, Zr: at most 1.0%, and Hf: at most 1.0%;
third group: Mo: at most 5%, Ta: at most 5%, W: at most 5%, and Re: at most 5%; and
fourth group: Ca: at most 0.1%, Mg: at most 0.1%, B: at most 0.1%, and rare earth metal (REM): at most 0.1%.

* * * * *